Figure 1:
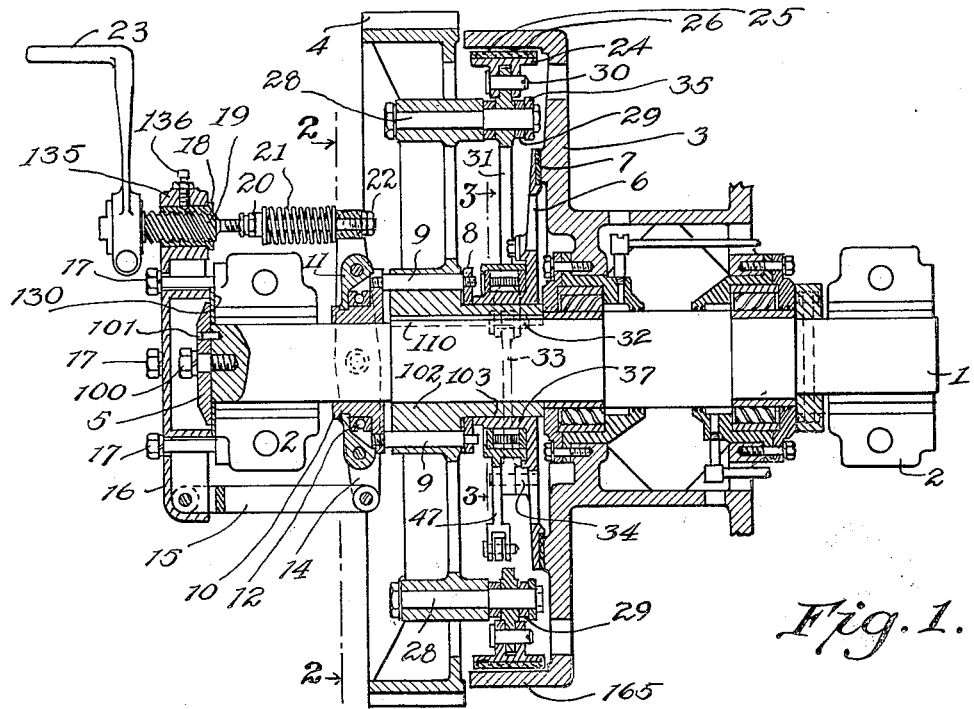

May 9, 1933.  O. L. BERBY  1,907,480

FRICTION CLUTCH MECHANISM

Filed Oct. 18, 1930  3 Sheets-Sheet 1

INVENTOR.
Ola L. Berby
Fay Oberlin & Fay
ATTORNEY.

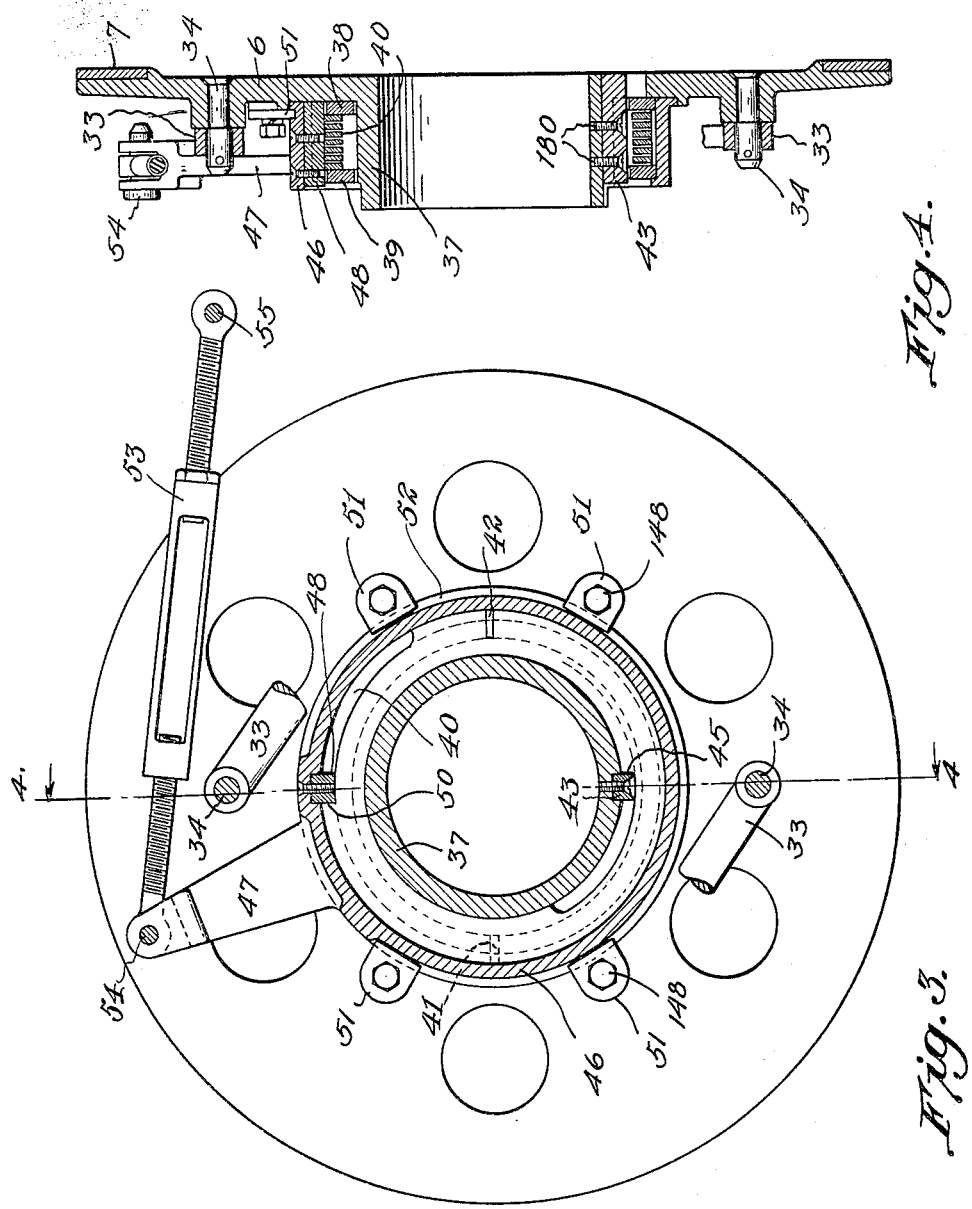

May 9, 1933.   O. L. BERBY   1,907,480
FRICTION CLUTCH MECHANISM
Filed Oct. 18, 1930   3 Sheets-Sheet 3
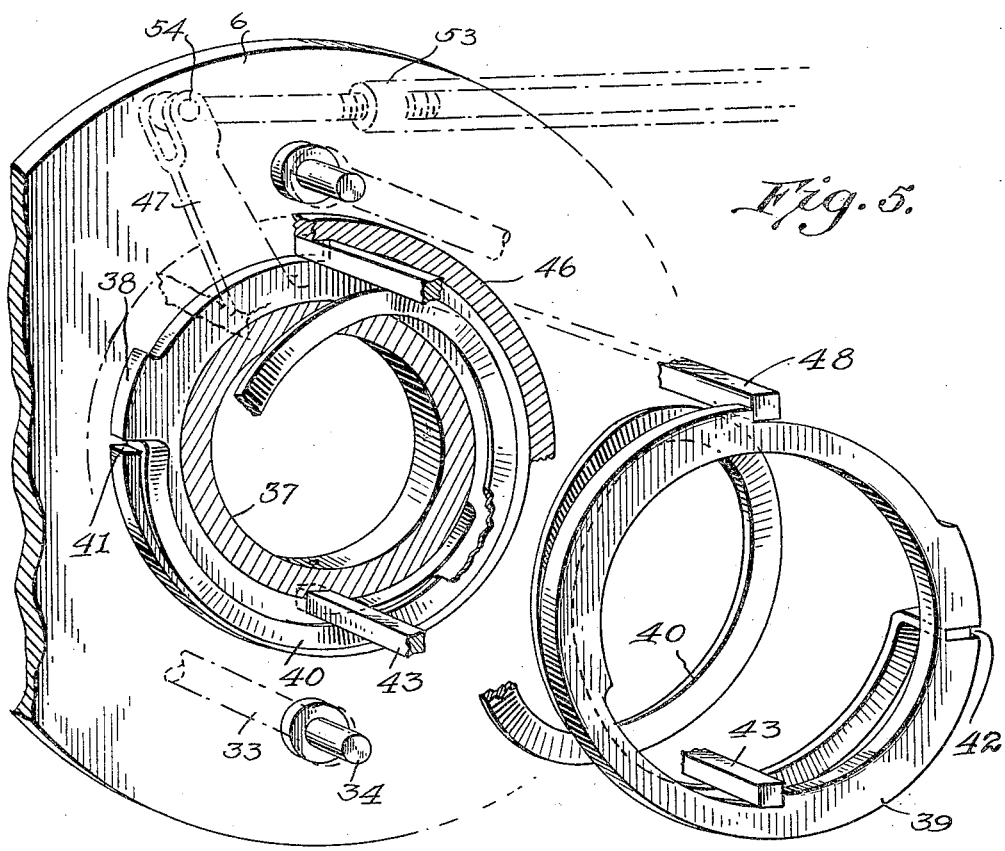
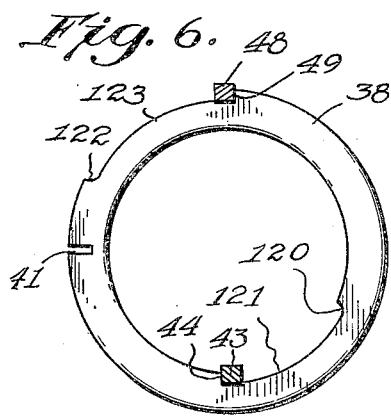
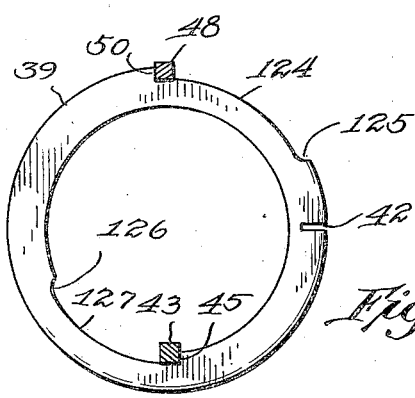
Inventor
Ola L. Berby
By Fay Oberlin + Fay
Attorneys Patented May 9, 1933

1,907,480

UNITED STATES PATENT OFFICE

OLA L. BERBY, OF DULUTH, MINNESOTA, ASSIGNOR TO CLYDE IRON WORKS, OF DULUTH, MINNESOTA, A CORPORATION OF MAINE

FRICTION CLUTCH MECHANISM

Application filed October 18, 1930. Serial No. 489,650.

This invention, relating, as indicated, to friction clutch mechanism is more particularly directed to that type of clutch in which a driving member is fixed to a shaft, and a driven member rotates freely on said shaft with means between said two members for rotating the driven member at any desired speed.

A still more particular object of the invention is the provision of a primary manually controlled engaging means and a secondary mechanically controlled engaging means, the application of the former being actuated by a small external force, this application causing the secondary engaging means to be actuated. Comparatively little power is required to set up the primary frictional engaging means and this power sets up the secondary frictional engaging means, the load of this secondary means being carried practically by the mechanism itself. The particular embodiment which I have chosen to illustrate my invention, consists of a driving member which is a gear, and a driven member which is a hoisting drum, but obviously other elements could be connected in my novel manner and produce the same result.

A number of methods are in vogue for connecting driving and driven members in some of which the driven member revolves freely on the shaft, and in others of which the driving member revolves freely, but in this instance the invention comprises connection of a driven member which is freely rotatable upon a shaft to which a driving member is rotatably fixed.

It will also be seen that the clutch of my invention is controlled by a minimum of manual effort and that accurate control of the drum is possible, and furthermore. that the drum may be easily and quickly released from engagement. It will also be noted that the mechanism itself supplies most of the power for clutching the driving and driven members, whereas in the usual clutch arrangement it is the setting up of the clutch itself which requires very considerable effort, so much so that in the larger sizes of clutches now in use on heavier machinery, it has become necessary to use power, rather than manual means, to operate the clutch.

All of the description and drawings relate to a clutch in which the friction band is of the expanding type but it will be readily apparent that a contracting friction band could be used just as well, since both types of bands are well known.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 2:
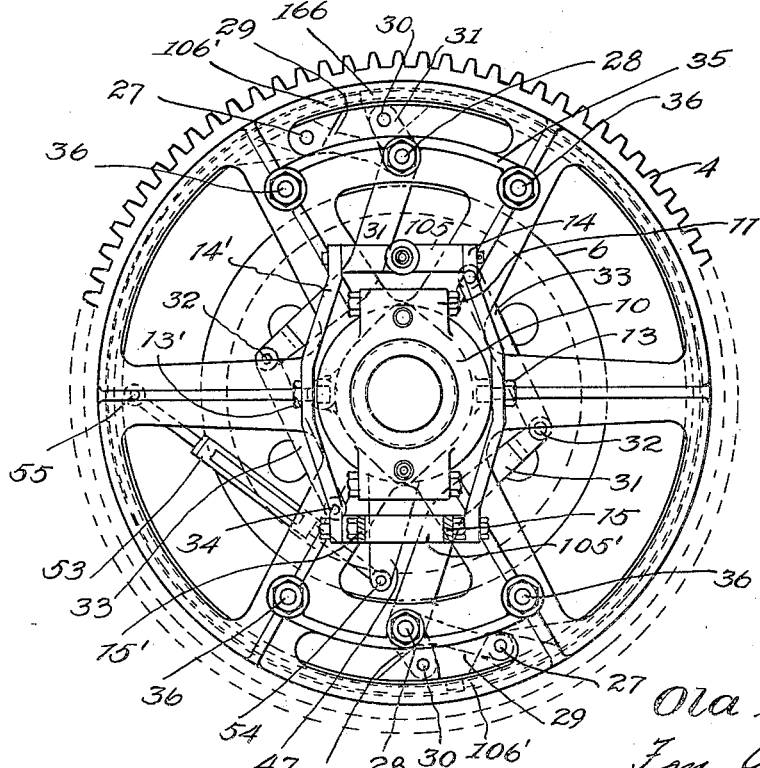

Fig. 1 is a longitudinal central vertical section; Fig. 2 is a transverse vertical section on the line 2—2 of Fig. 1; Fig. 3 is a transverse vertical section on the line 3—3 of Fig. 1 with parts rotated 180°; Fig. 4 is a central vertical section of Fig. 3 the plane of the section being indicated by the line 4—4; Fig. 5 is a perspective view of Fig. 3 with parts in section; Fig. 6 is a detail elevation; and Fig. 7 is also a detail elevation.

Referring now to the drawings, and more particularly to Fig. 1, it will be seen that the clutch mechanism there illustrated is supported on a shaft 1 that rotates freely in bearings 2, this shaft having an end plate 5 secured thereto by means of a cap screw 100 and a pin 101, the said end plate engaging a bearing washer 130, and this end plate preventing longitudinal movement of the shaft 1. A hoisting drum 3 is mounted on the shaft 1 in such a manner as to rotate freely thereon, the illustration showing the provision of anti-friction bearings but since these bearings form no part of the present invention they need not be described here, as a conventional bushing would serve the purpose just as well as far as the invention of this application is concerned. A gear 4 is shown adjacent the drum 3, this gear being fixed to the shaft 1 by means of a key 110, and having a main hub 102 with an elongated or smaller hub 103. Slidably and revolubly mounted on such extended hub 103 of gear 4 is a friction disc 6 which is provided with a friction surface 7 adapted to bear against a similar surface on the drum 3. Immediately adjacent the hub 37 of the friction disc 6 and also mounted on the extended hub 103 of the gear is a thrust collar 8, which collar is connected by means of pins 9 to the collar 10. The collar 10 is slidably mounted on the shaft 1 outside of gear 4, and obviously it turns with gear 4 as well as the thrust collar 8. Adjacent the collar 10 a split collar 11 is mounted in an anti-frictional manner by means of the ball bearing assembly 12 so that the split collar 11 remains stationary as far as rotational movement is concerned, while the collar 10 revolves with the gear 4. The split collar 11 is provided with trunnions 13 and 13' which engage the vertical yoke members 14 and 14', respectively, the said vertical yoke members being connected by the cross member 105 at the top, and the cross member 105' at the bottom. One end of the yoke member is connected to the casting 16 by means of the links 15 and 15', this being the lower end. The casting 16 is secured to the bearing 2 by means of a number of cap screws 17 in such a manner that an extended portion 135 rises above the uppermost portion of the bearing 2. A screw threaded nut 18 is fixed in this extension 135 by means of a set screw 136, and this screw threaded nut has a screw 19 received therein, one end of the screw having a hand lever 23 affixed thereto. The other end of the screw is elongated so as to connect to the cross member 105 of the before mentioned yoke, the connection being loosely made through the cross member. An adjusting and abutment nut is adjustably fixed on screw 19 and between this nut 20 and the yoke member 105, and bearing against each is a compression spring 21, the whole screw and its parts being held in assembled relation by means of the nut 22. The nut holds the yoke member 105 against the spring 21, and permits the desired tensioning of the spring by means of the adjusting nut 20.

With the arrangement of parts just described it is evident that when the screw 19 is turned in a clockwise direction when viewed from the left of Fig. 1, the yoke will be moved to the right, moving the collar 10 which in turn will move the collar 8. The last-named collar bearing against the hub 37 of the friction disc 6 will cause this disc to engage the friction surface of the drum 3. As the pressure from the screw 19 is transmitted to the yoke members 14 and 14' through the compression spring 21 the pressure between the friction disc and the drum and the friction resulting therefrom is directly controlled by varying the position of the hand lever 23. The above described mechanism and parts constitute the primary friction means.

The primary friction means so far described is used to actuate the secondary and principal friction clutch which is of the expanding band type. This expanding band consists of two identical halves 24 which are not only identical in form but also operate in the same manner. The bands 24 are faced with a friction lining 25, which lining is adapted to engage the inner surface 26 of the lip 165 of the drum 3, each half of the friction band having one dead end, or fixed end 106', and another movable end 166. The dead end 106' is connected to the gear 4 by means of pin 27 in the band, link 29 and pin 28 in the gear. The live or movable end 166 of the band 24 is connected by means of the pin 30 to the lever 31, which is fulcrumed upon the pin 28 in the gear 4, the lever being bent at the fulcrumed point and extending downwardly and upwardly as viewed in Fig. 2 to a pivot pin 32 by means of which it is connected to a link 33, the said link having a pivotal connection at 34 to the friction disc 6. The outer ends of pins 28 are supported by plates 35, which plates are secured to the gear 4 by means of bolts 36, the said plates being of heavy durable material so as to efficiently act as a means of supporting the fulcrum of the secondary friction mechanism. It will thus be seen that when the disc 6 turns in a clockwise direction as viewed in Fig. 2, the long lever 31 and link 33 will converge and the band clutch will be expanded by reason of the short arm of the long lever 31 turning in a clockwise direction. This relative turning will occur whenever the gear 4 turns in an anti-clockwise direction in relation to drum 3, or whenever drum 3 turns in a clockwise direction relative to gear 4, the friction disc being at the same time thrust into engagement with the drum 3.

The above description has been directed to the primary and secondary friction engaging means, and now the releasing means will be described. The releasing means is shown somewhat distorted in Fig. 5 in which view the key elements are illustrated as having an exaggerated length. When the clutch is released by discontinuing the pressure between the friction disc 6 and drum 3 the disc 6 must turn in an anti-clockwise direction in relation to gear 4 in order to release the bands 24. In order that this action be quick and to assure proper clearance between the bands 24 and the friction surface 26 when the clutch is released a spring mechanism is employed which normally holds disc 6 in a determined position in relation to gear 4 when at rest, and quickly returns it to that position when it is released from the torsional effect due to friction contact with the drum 3. On the hub 37 of the disc 6 two collars 38 and 39 are mounted, which collars are free to turn within fixed limits. The collar 38 is placed adjacent the disc 6 and has a groove 123 therein in which a key 48 may move. This groove has a stop shoulder at 49 against which the key 48 normally bears. A similar groove 121 is also cut in ring 38 for the reception of the key 43. This groove also has a limiting shoulder at 44. The key 43 normally bears against the shoulder 44, but it will be seen that motion of the collar in a direction away from the shoulders is allowed, which motion in Fig. 6 would be clockwise. The outer ring 39 is quite similar to ring 38 with the exception that the grooves are reversed. This ring has a groove 124, with a shoulder 50, in which the key 48 moves, and another groove 127, with a shoulder 45, in which the key 43 moves. These two collars 38 and 39 are resiliently connected together by means of a coil spring 40, the ends of the spring 40 being bent into the groove 41 of the ring 38, and at the opposite end into the groove 42 of the ring 39. The key 43 is secured to the hub 37 of the friction disc 6 by means of the screws 180, and similarly key 48 is secured to the sleeve 46 by means of small screws. The sleeve 46 surrounds the two rings and the spring and this sleeve is provided with a projecting arm 47 which is connected by means of a pin 54 to an adjustable link in the form of a turn buckle 53, the opposite end of the turn buckle being connected to a pin 55 on the gear 4. In order to prevent axial or longitudinal movement of the sleeve 46, with respect to the disc 6 this sleeve is provided with a groove 52 in which lugs 51 are received, the said lugs being secured to the frictional disc 6 by means of head bolts 148. From this it will be seen that the position of the sleeve 46 is fixed as far as longitudinal movement along the hub 37 is concerned, and also fixed as far as movement with respect to the disc 6 is concerned. As the friction lining 25 wears, the turn buckle 53 is taken up to compensate for such wear and to maintain the proper clearance at all times. The key 48 being fixed to sleeve 46 will always be held in a determined position, and it is obvious that if the disc 6 is turned in a counter-clockwise direction as viewed in Fig. 5 the spring 40 will be further coiled up and upon release will return to normal position. This action will be understood from an inspection of Figs. 3 to 7, inclusive, in which the key 43 is shown bearing against the shoulder 45 of the ring 39. As the key 43 moves in a counter-clockwise direction the ring 39 is caused to move in the same direction, but movement of the ring 38 is prevented because of the key 48 bearing against the shoulder 49, so that coiling of the spring occurs, and when pressure is released on the frictional disc the spring returns the parts to their normal position, thus contracting the friction bands and disconnecting the driving and driven members. The spring 40 is given a sufficient amount of initial tension in order to render its action quick and effective and the entire spring mechanism is double acting in that it cushions the mechanism so as to avoid shock on the parts when the disc is suddenly returned to its normal position, and also serves as a return means.

It is believed that operation of my improved clutch is clear from the foregoing but a short description will be added in order to link up the entire mechanism.

The lever 23, which I have described as a hand lever, but which obviously may be changed to a foot lever, when moved in a direction toward the observer, that is, in a clockwise direction as viewed from the left of Fig. 1, causes movement of the screw 19. This movement is transmitted to the yoke members 14 which in turn transmit it by means of the trunnions 13 and 13' to the split collar 11. The split collar 11 engages the collar 10 which by means of the pins 9, moves the thrust collar 8. The thrust collar 8 bears against the hub 37 of the friction disc 6 and causes its frictional surface 7 to engage a similar surface on the drum 3. If, for example, the drum 3 is stationary at this time the gear 4 moving in a counter-clockwise direction as viewed in Fig. 2 will cause the long levers 31 and links 33 to double up and converge, which in turn cause the friction bands to expand and grip the drum 3. As soon as pressure is released on the friction disc the spring releasing mechanism turns the friction disc with respect to the gear 4, and the link 33 and long lever 31 open up and thus contract the friction bands which in turn releases the drum.

From the foregoing description it will be seen that I have provided a clutch in which most of the power necessary to engage a driven member is supplied by the mechanism itself. It will also be noted that the clutch arrangement which I have illustrated is extremely advantageous where accurate handling is required, since engagement of the driven member is very easily obtained, and the release of such member is just as easily obtained.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a clutch mechanism, a shaft, a driving member keyed to said shaft, a driven member rotatably mounted upon said shaft, friction bands carried by said driving member, a friction disc resiliently connected to said driving member and movable axially with respect thereto and adapted to engage said driven member, operative connections including a pair of links and levers connecting said disc and said friction bands, adapted upon engagement of said disc with said driven member to cause said pair of links and levers to actuate said friction bands, the resilient connection between said disk and said driving member including an adjustable torsion spring.

2. In a clutch mechanism, a shaft, a driving member keyed to said shaft, a driven member rotatably mounted upon said shaft, a friction band carried by said driving member, a friction disc resiliently connected to said driving member and movable axially with respect thereto and adapted to engage said driven member, operative connections between said disc and band adapted upon such engagement of said disc with said driven member to cause said friction band to engage said driven member, such connection between said driving member and said disc including a torsion spring normally tending to keep said friction band out of engagement with said driven member.

3. In a clutch mechanism, a shaft, a driving member keyed to said shaft, a driven member rotatably mounted upon said shaft, a friction band carried by said driving member, a friction disc resiliently connected to said driving member and movable axially with respect thereto and adapted to engage said driven member, operative connections between said disc and band adapted upon such engagement of said disc with said driven member to cause said friction band to engage said driven member, such connection between said driving member and said disc including a torsion spring normally tending to keep said friction band out of engagement with said driven member, there being an adjusting means to regulate the tension of said spring.

4. In a clutch mechanism, a driving member having a friction band attached thereto, a friction disc, and a driven member, means extending thru the hub of said driving member adapted to move said friction disc axially into engagement with said driven member, and means affected by such engagement adapted to move said friction band radially, said last named means including a link and lever, said link and lever having means associated therewith to return them to inoperative position.

5. In a clutch mechanism, a driving member having a friction band attached thereto, a friction disc, and a driven member, means extending thru the hub of said driving member adapted to move said friction disc axially into engagement with said driven member, and means affected by such engagement adapted to move said friction band radially, said last named means including a link and lever, one end of said link being pivotally attached to said disc and one end of said lever being attached to said friction band, said link and lever having means associated therewith to return them to inoperative position.

6. In a clutch mechanism, a driving member having a friction band attached thereto, a friction disc, and a driven member, means extending thru the hub of said driving member adapted to move said friction disc axially into engagement with said driven member, and means affected by such engagement adapted to move said friction band radially, said last named means including a link and lever, one end of said link being pivotally attached to said disc and one end of said lever being attached to said friction band, said lever having a fulcrum from a pin on said driving member, said link and lever having means associated therewith to return them to inoperative position.

7. In a clutch mechanism, a driving member having a friction band attached thereto, a friction disc, and a driven member, means extending thru the hub of said driving member adapted to move said friction disc axially into engagement with said driven member, and means affected by such engagement adapted to move said friction band radially outward, said last named means including a link and lever, one end of said link being pivotally attached to said disc and one end of said lever being attached to said friction band, said lever having a fulcrum from a pin on said driving member, other ends of said link and lever being connected by a movable pivot pin.

8. In a clutch mechanism, a shaft, a driving member keyed to said shaft, a driven member rotatably mounted upon said shaft, a friction band carried by said driving member, a friction disc resiliently connected to said driving member and movable axially with respect thereto and adapted to engage said driven member, operative connections between said disc and band adapted upon such engagement of said disc with said driven member to cause said friction band to expand and engage said driven member, and such resilient connection including means between said driving member and said disc normally tending to retract said disc out of engagement with said driven member.

9. In a clutch mechanism, a shaft, a driving member keyed to said shaft, a driven member rotatably mounted upon said shaft, a friction band carried by said driving member, a friction disc resiliently connected to said driving member and movable axially with respect thereto and adapted to engage said driven member, operative connections between said disc and band adapted upon such engagement of said disc with said driven member to cause said friction band to expand and engage said driven member, and such connection between said driving member and said disc comprising means normally tending to keep said friction band out of engagement with said driven member, said means including a sleeve, a pair of rings connected by a spring, and lugs on said disc engaging a groove in said sleeve.

10. In a clutch mechanism, a shaft, a driving member keyed to said shaft, a driven member rotatably mounted upon said shaft, a friction band carried by said driving member, a friction disc resiliently connected to said driving member and movable axially with respect thereto and adapted to engage said driven member, operative connections between said disc and band adapted upon such engagement of said disc with said driven member to cause said friction band to expand and engage said driven member, such connection between said driving member and said disc comprising means normally tending to keep said friction band out of engagement with said driven member, said means including a sleeve, a pair of rings connected by a spring, and lugs on said disc engaging a groove in said sleeve, said sleeve having a key thereon, and said disc having a key on its hub, said keys engaging grooves in said rings.

Signed by me, this 3rd day of October 1930.

OLA L. BERBY.